US011835660B2

(12) United States Patent
Vitanov et al.

(10) Patent No.: US 11,835,660 B2
(45) Date of Patent: Dec. 5, 2023

(54) SENSOR ASSEMBLY AND METHODS OF OPERATION

(71) Applicant: Pony AI Inc., Grand Cayman (KY)

(72) Inventors: Anatolii Vitanov, Fremont, CA (US); Cyrus F. Abari, San Bruno, CA (US)

(73) Assignee: Pony AI Inc., Grand Cayman (KY)

( * ) Notice: Subject to any disclaimer, the term of this patent is extended or adjusted under 35 U.S.C. 154(b) by 565 days.

(21) Appl. No.: 17/039,143

(22) Filed: Sep. 30, 2020

(65) Prior Publication Data

US 2022/0066003 A1 Mar. 3, 2022

Related U.S. Application Data

(60) Provisional application No. 63/070,109, filed on Aug. 25, 2020.

(51) Int. Cl.
*G01S 7/48* (2006.01)
*G01S 7/497* (2006.01)
*G01S 17/931* (2020.01)

(52) U.S. Cl.
CPC .......... *G01S 7/497* (2013.01); *G01S 17/931* (2020.01); *G01S 2007/4977* (2013.01)

(58) Field of Classification Search
None
See application file for complete search history.

(56) References Cited

U.S. PATENT DOCUMENTS

| 8,567,963 B1 * | 10/2013 | Criscuolo .......... G02B 27/0006 359/507 |
| 10,578,716 B1 * | 3/2020 | Hu .................... G01S 13/931 |
| 10,589,726 B1 * | 3/2020 | Ingram ................. G01S 7/4813 |
| 2018/0370500 A1 * | 12/2018 | Garcia Crespo ... G02B 27/0006 |
| 2019/0235055 A1 | 8/2019 | Bandstra et al. |
| 2021/0309187 A1 * | 10/2021 | Rice ......................... B60S 1/56 |
| 2022/0048477 A1 * | 2/2022 | Newhouse ............ G01S 17/931 |

FOREIGN PATENT DOCUMENTS

WO 20140162719 A1 3/2014

* cited by examiner

*Primary Examiner* — Hovhannes Baghdasaryan

(57) ABSTRACT

Described herein is a sensor assembly and a method of operating the sensor assembly. In various embodiments, the sensor assembly can comprise a base component, a light detection and ranging (LiDAR) sensor, a transparent cylinder, a motor component, and a controller. The LiDAR sensor can be mounted on a support platform disposed centrally on the base component. The transparent cylinder can be disposed peripherally to the LiDAR sensor and can provide a field of view (FOV) for the LiDAR sensor. The transparent cylinder can be rotated independently of the base component. The motor component can be disposed on the base component, adjacent to the support platform. The motor component can be coupled to the transparent cylinder through a gearset and configured to rotate the transparent cylinder. The controller can be configured to obtain sensor data from on-board vehicle sensors. The controller can determine a level of obscurement on the transparent cylinder based on the sensor data. The controller can determine that the level of obscurement exceeds a threshold level of obscurement. The controller can transmit an actuation signal to the motor component to cause a rotation of the transparent cylinder at a rotational speed. The rotation of the transparent cylinder can disperse obscurements away from the transparent cylinder.

20 Claims, 12 Drawing Sheets

SENSOR ASSEMBLY AND METHODS OF OPERATION

CROSS-REFERENCE TO RELATED APPLICATION

This application claims the benefit under 35 U.S.C. 119(e) of U.S. Provisional Application No. 63/070,109, filed on Aug. 25, 2020, the content of which is hereby incorporated in its entirety.

FIELD OF THE INVENTION

The present invention relates to a sensor assembly and methods of operating the sensor assembly. More particularly, the sensor assembly can be configured to rotate a transparent cylinder of the sensor assembly to remove liquid and/or other debris from the transparent cylinder.

BACKGROUND

A vehicle such as an autonomous or semi-autonomous vehicle can include a myriad of sensors that provide a continuous stream of sensor data captured from a surrounding environment of the vehicle. Such sensor data can enable an autonomous vehicle to perform a number of driving functions that would otherwise be performed by a human operator. These driving functions, for example, can include various vehicle navigation tasks such as vehicle acceleration and deceleration, vehicle braking, vehicle lane changing, adaptive cruise control, blind spot detection, rear-end radar for collision warning or collision avoidance, park assisting, cross-traffic monitoring, emergency braking, and automated distance control.

A vehicle such as an autonomous or semi-autonomous vehicle can include a variety of on-board sensors including, for example, cameras, light detection and ranging (LiDAR) sensors, radars, Global Positioning System (GPS) devices, sonar-based sensors, ultrasonic sensors, accelerometers, gyroscopes, magnetometers, inertial measurement units (IMUs), and far infrared (FIR) sensors. These on-board sensors can be disposed on an exterior of a vehicle and provided in or integrated with a protective housing to protect these sensors from damage from environmental elements. The housing, however, can be subjected to rain, heat, wind, or the like that can impede abilities of the sensors encased in the housing to perform their function. For example, a LiDAR may have strict requirements for visibility. When water droplets or other debris block a field-of-view (FOV) of the LiDAR, the LiDAR may not work properly or as intended in gathering surrounding information. Technical solutions that mitigate effects of such factors on sensor performance and enhance functional capabilities of sensors are described herein.

SUMMARY

Described herein is a sensor assembly and a method of operating the sensor assembly. In various embodiments, the sensor assembly can comprise a base component, a light detection and ranging (LiDAR) sensor, a transparent cylinder, a motor component, and a controller. The LiDAR sensor can be mounted on a support platform disposed centrally on the base component. The transparent cylinder can be disposed peripherally to the LiDAR sensor and can provide a field of view (FOV) for the LiDAR sensor. The transparent cylinder can be rotated independently of the base component. The motor component can be disposed on the base component, adjacent to the support platform. The motor component can be coupled to the transparent cylinder through a gearset and configured to rotate the transparent cylinder. The controller can be configured to obtain sensor data from on-board vehicle sensors. The controller can determine a level and/or distribution of obscurements on the transparent cylinder based on the sensor data. For example, the distribution of obscurements may indicate that a relatively higher level of obscurements may be present on one side or portion of the transparent cylinder. The controller can determine that the level of obscurement exceeds a threshold level of obscurement. The controller can transmit an actuation signal to the motor component to cause a rotation of the transparent cylinder at a rotational speed. The rotation of the transparent cylinder can disperse obscurements away from the transparent cylinder.

In some embodiments, the base component can comprise a first set of vent holes arranged concentrically around the support platform. The transparent cylinder can comprise a second set of vent holes disposed along a top portion of the transparent cylinder.

In some embodiments, the sensor assembly can further comprise a circular cap and a fan blade. The circular cap can be disposed above the transparent cylinder. The circular cap can comprise a lip that overlaps the top portion of the transparent cylinder. The fan blade can be attached to a rotatable portion of the support platform. The motor component can be configured to rotate the fan blade through the gearset.

In some embodiments, the actuation signal to the motor component can further cause a rotation of the fan blade at the rotational speed.

In some embodiments, the rotation of the fan blade can generate an airflow inside the sensor assembly through the first set of vent holes on the base component.

In some embodiments, the airflow can be generated using air from a passenger cabin of the vehicle or an air conditioning unit.

In some embodiments, the airflow can exit the sensor assembly through the second set of vent holes on the transparent cylinder.

In some embodiments, the exiting airflow can be redirected by the lip of the circular cap into one or more downward air streams. The one or more downward air streams can travel along an outer surface of the transparent cylinder. The one or more downward air streams can disperse the obscurements away from the transparent cylinder.

In some embodiments, the rotational speed can be determined based on surface tension of water, mass of a water droplet, radius of a water droplet, and radius of the transparent cylinder.

In some embodiments, the obscurements on the transparent cylinder can comprise one or more of water droplets, moisture, dusts, or debris.

In some embodiments, the sensor data can comprise at least one of moisture data or image data. The on-board sensors can comprise at least one of a moisture sensor or a camera.

In some embodiments, the controller can determine the level of obscurement on the transparent cylinder based on the moisture data from the moisture sensor. The moisture data can indicate a level of moisture associated with the transparent cylinder.

In some embodiments, the level of moisture can be correlated with the level of obscurement.

In some embodiments, the threshold level of obscurement can be a predetermined level of moisture that impairs functions associated with the LiDAR through the FOV provided by the transparent cylinder.

In some embodiments, the controller can determine the level of obscurement on the transparent cylinder based on the image data from the camera. The image data can comprise one or more images captured by the camera through a second FOV provided by the transparent cylinder. The one or more images can indicate a number of obscurements on a portion of the transparent cylinder that provided the second FOV.

In some embodiments, the controller can determine that the level of obscurement exceeds the threshold level of obscurement by comparing the one or more images with a baseline image. The baseline image can be an image without obscurements.

In some embodiments, the sensor data can further comprise vehicle velocity data. The vehicle velocity data can indicate a velocity of the vehicle. The controller can be further configured to adjust the rotational speed based on the velocity of the vehicle.

In some embodiments, the controller can transmit a second actuation signal to the motor component to reduce the rotational speed when the velocity of the vehicle exceeds a threshold velocity.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present invention are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
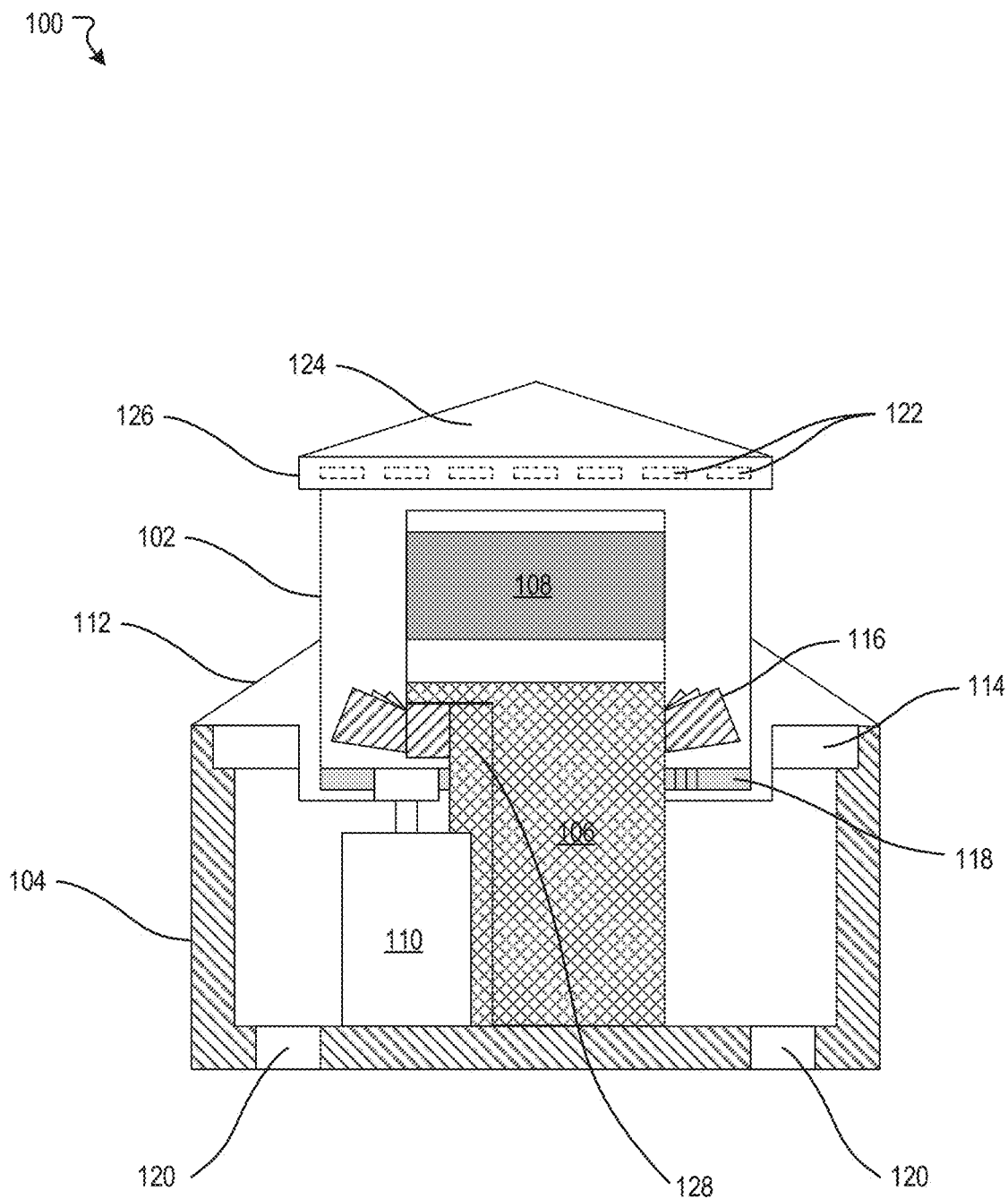
FIG. 1 illustrates a cross-sectional view of a sensor assembly and its associated components in accordance with various embodiments of the present invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises," "comprising," "includes," "including," "contains," or "containing" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents and vice versa unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "some embodiments" or "various embodiments" means that a particular feature, structure or characteristic described in connection with the embodiment is included in at least one embodiment of the present invention. Thus, the appearances of the phrases "in some embodiments" or "in various embodiments" in various places throughout this specification are not necessarily all referring to the same embodiment, but may be in some instances. Furthermore, the particular features, structures, or characteristics may be combined in any suitable manner in one or more embodiments.

In general, a vehicle such as an autonomous or semi-autonomous vehicle may be provided with various on-board vehicle sensors including, for example, cameras, light detection and ranging (LiDAR) sensors, radars, global positioning system (GPS) devices, sonar-based sensors, ultrasonic sensors, accelerometers, gyroscopes, magnetometers, inertial measurement units (IMUs), far infrared (FIR) sensors, or the like. Sensor data collected by these sensors may be used to facilitate a variety of autonomous vehicle operations. For example, LiDAR data collected by a LiDAR may help an autonomous vehicle to detect and recognize objects around the autonomous vehicle. On-board vehicle sensors disposed on an exterior of a vehicle may be provided in or integrated with a protective housing to protect these sensors from damage from environmental elements. More specifically, as an example, multiple sensors/types of sensors may be provided as part of a sensor assembly that is disposed, at least in part, on an exterior surface of an autonomous vehicle. At least some of the sensors may be encased within the sensor assembly.

As a non-limiting example, a sensor assembly may include, without limitation, one or more of LiDARs, cameras, and radars. A LiDAR may be housed within or encased by the sensor assembly. The sensor assembly may also include a transparent cylinder. The transparent cylinder may provide the LiDAR with a field of view (FOV) of an external environment. During vehicle operation, the transparent cylinder can become obscured with debris such as dust, for example. In addition, when a vehicle is operated in a wet condition, liquid from various sources (e.g., water splashed up from a road surface, rain, etc.) can also obscure the transparent cylinder. The obscurement of the transparent cylinder, whether from debris or rain or the like, can result in diminished functions of the LiDAR due to diminished quality of LiDAR data captured by the LiDAR. This can be particularly dangerous for autonomous vehicles that rely on LiDAR data to perform a variety of tasks critical to driverless vehicle operations such as object detection, object classification, object tracking, and the like. For example, LiDAR data without obscurement is needed to accurately determine distances between vehicles, to determine safe braking distances, and to safely navigate around vehicles.

A solution described herein addresses the problems discussed above. In various embodiments, a sensor assembly can be configured to rotate a transparent cylinder of the sensor assembly in order to disperse water, moisture, debris, or the like from an outer surface of the transparent cylinder. The transparent cylinder can be rotated independently of the sensor assembly. In various embodiments, the transparent cylinder may be a glass, strengthen glass, or acrylic window that provides sensors (e.g., a LiDAR, a camera, etc.) encased by the sensor assembly with a field-of-view (FOV) of an external environment. In some embodiments, sensor data captured from various on-board vehicle sensors such as moisture data, image data, vehicle velocity data, or the like can be evaluated against various criteria to determine a speed and a duration with which to rotate the transparent cylinder. In such embodiments, the sensor data can be evaluated over a period of time to identify patterns or trends relating to one or more vehicle parameters. An activation schedule for initiating or ceasing rotation or controlling a rotational speed of the transparent cylinder can be determined based on such patterns/trends. For example, in some embodiments, the transparent cylinder may need to rotate faster as vehicle velocity decreases to more effectively disperse water or other debris from the surface of the transparent cylinder. In some embodiments, the sensor assembly may be configured to draw air from an external source (e.g., a passenger cabin, air conditioning unit, etc.) to generate one or more downward air streams to further disperse water or other debris from the surface of the transparent cylinder. These and other features of the invention are discussed below.

Described herein is a sensor assembly and a method of operating the sensor assembly. In various embodiments, the sensor assembly can include a transparent cylinder. A controller associated with the sensor assembly can be configured to cause the transparent cylinder to rotate in order to disperse debris, liquid droplets, condensation, or any other environmental contaminants from the transparent cylinder. In some embodiments, the sensor assembly can include a support component adapted to support the transparent cylinder. The support component may be coupled to a bearing through which the support component can be attached to a housing of the sensor assembly. In some embodiments, the support component can further include a fan blade that, when rotated, can draw air from an external source into the sensor assembly through a first set of vent holes. This air can exit the sensor assembly through a second set of vent holes such that when exiting, one or more downward air streams are generated to flow or travel along an outer surface of the transparent cylinder. The one or more downward air streams can further disperse debris, liquid droplets, condensation, or any other environmental contaminants from the transparent cylinder. In some embodiments, the sensor assembly can include a motor component such as an electric motor that can be configured to provide motive power to the support component to cause the transparent cylinder and the fan blade to rotate at a desired rotational speed. In this manner, clarity of a FOV provided to a sensor housed in the sensor assembly, through the transparent cylinder, is ensured even under poor environmental conditions, and thus, functions of the sensor are unaffected under the poor environmental conditions. Furthermore, in some embodiments, the support component and the motor component are positioned in the sensor assembly such that a sensor can be provided with a substantially unobscured FOV through the transparent cylinder. For example, a LiDAR can be positioned at or near a center axis of the transparent cylinder without components of the sensor assembly obscuring the transparent cylinder, thereby providing the LiDAR with a more expansive FOV. The sensor assembly will be discussed in greater detail in reference to FIG. 1 herein.

A computer-implemented method for controlling operation of the sensor assembly is disclosed. In various embodiments, the method can include receiving sensor data from various on-board vehicle sensors. The sensor data can include, without limitation, moisture data, image data, vehicle velocity data, LiDAR data, or the like. In some embodiments, the method can further include determining a level of obscurement on the transparent cylinder of the sensor assembly based at least in part on the sensor data, and determining whether the level of obscurement exceeds a threshold level. For example, a level of obscurement can be determined based on image data obtained from a camera housed in or encased by the sensor assembly. As another example, a level of obscurement can be determined based on LiDAR data obtained from a LiDAR housed in or encased by the sensor assembly. If the transparent cylinder is obscured beyond the threshold level, an actuation signal can be sent from the controller to the sensor assembly to cause the transparent cylinder to rotate at a rotational speed sufficient to disperse liquid, debris, or the like from the transparent cylinder. In some embodiments, the actuation signal can additionally cause the fan blade to rotate at the same rotational speed as the transparent cylinder. The rotation of the fan blade can cause air to be drawn into the sensor assembly and, when exiting, generate one or more downward air streams to further disperse water and/or debris from the transparent cylinder.

In some embodiments, the method can further evaluate a vehicle velocity in relation to a threshold vehicle velocity. If the vehicle velocity is determined to be less than the threshold vehicle velocity—which may indicate that the vehicle velocity is insufficient to generate enough naturally circulating wind around the transparent cylinder to produce a desired dispersion effect—an actuation signal may be sent to the sensor assembly to initiate a rotation of the transparent cylinder at a determined rotational speed. It should be appreciated that any discussion herein of a first value exceeding or being greater than a second value also encompasses the first value being greater than or equal to the second value. Similarly, it should be appreciated that any discussion herein of a first value being below or less than a second value also encompasses the first value being less than or equal to the second value.

In some embodiments, the sensor data can include moisture data indicative of a moisture level of the transparent cylinder. If, for example, a vehicle is being operated in a raining or wet condition, moisture data may indicate a high moisture level due to liquid droplets (e.g., water, rain, etc.) on the transparent cylinder. In this example, a level of obscurement may be correlated to a moisture level indicated by the moisture data. In some embodiments, the sensor data can include image data captured by a camera encased by the sensor assembly. The image data may indicate an obscured view of the camera through the transparent cylinder. The transparent cylinder may become obscured by obscurements such as dust, debris, or water droplets or streams of liquid resulting from rain, splashed water from the road surface, or the like. Similar to the moisture level, a degree of impairment on clarity of the image data may be indicative of the level of obscurement of the transparent cylinder. For example, a level of obscurement of the transparent cylinder can be determined by comparing an image captured through an obscured transparent cylinder to a baseline unobscured image.

In some embodiments, object recognition or object detection techniques can be applied to the image data to identify obscurements on the transparent cylinder. The object recognition or object detection techniques can be used to identify a type of obscurement (e.g., a water droplet, dust, etc.). In some cases, the object recognition or object detection techniques can be used to determine a number of obscurements in the image. In some examples, the object recognition or object detection techniques can determine or indicate a distribution of obscurements. The distribution may indicate that a relatively higher level of obscurements may be present on one side or portion of the transparent cylinder.

In some embodiments, a rotational speed and a duration with which to rotate the transparent cylinder can be determined based on a level of obscurement of the transparent cylinder. For example, the greater the degree of obscurement of the transparent cylinder, the greater the rotational speed and/or the longer the duration. Furthermore, in some embodiments, the method for controlling the sensor assembly can include determining, based on the sensor data, historical patterns/trends relating to one or more vehicle parameters such as, for example, vehicle velocity, vehicle acceleration, moisture on one or more vehicle surfaces, or the like. The method can further include determining an activation schedule for initiating and ceasing rotation of the transparent cylinder of the sensor assembly. The activation schedule may indicate a periodicity with which the transparent cylinder is to be rotated, a respective duration for each rotation, a respective rotational speed for each rotation, and so forth. These are other aspects of the invention are discussed in greater detail below.

FIG. 1 illustrates a cross-sectional view of a sensor assembly and its associated components in accordance with various embodiments of the present invention. FIG. 1 depicts a sensor assembly 100 with a transparent cylinder 102 that provides a field-of-view (FOV) of an external environment for a LiDAR 108 encased by the sensor assembly 100. The LiDAR 108 can be mounted on a support platform 106 disposed centrally on a base component (e.g., a bottom) of the sensor assembly 100. As depicted in FIG. 1, in some embodiments, the transparent cylinder 102 can be attached to a support component 112 that forms a part of a housing 104 of the sensor assembly 100. The housing 104 can include one or more bearings 114 to which the support component 112 and the transparent cylinder 102 can be attached, affixed, or otherwise coupled to the housing 104. The one or more bearings 114 may be of any suitable type of bearing. The one or more bearings 114 can allow the support component 112 and the transparent cylinder 102 to rotate independently of the housing 104 when motive power is applied. In some embodiments, the support component 112 can include a gearset 118 and a fan blade 116. The gearset 118 may include one or more gears in any combination and/or configuration.

In some embodiments, the sensor assembly 100 can further include a motor component 110 disposed at the base component of the housing 104. The motor component 110 can be configured to provide motive power to cause the support component 112 and the transparent cylinder 102 to rotate. In some embodiments, to accommodate the motor component 110 inside the sensor assembly 100, the support platform 106 can include a cutout 128. In some embodiments, the motor component 110 can be an electric motor such as a synchronous motor, a brushless motor, a stepper motor, etc. The electric motor can be powered by an electricity source such as, for example, one or more batteries, solar or nuclear power sources. In some embodiments, the motor component 110 can be configured to supply motive power to the support component 112 through the gearset 118. The one or more gears of the gearset 118 may include teeth that are coupled to the motor component 110. In this manner, motive power from the motor component 110 can cause one or more gears of the gearset 112 to rotate, which in turn, cause the support component 112 and the transparent cylinder 102 to rotate in unison. In some embodiments, the transparent cylinder 102 and the support component 112 can rotate independently of the housing 104. It should be appreciated that an electric motor assembly is merely an example of the motor component 110 that provides the motive power. Other types of motors that operate on different principles and/or are powered by different power sources are also contemplated.

In some embodiments, the fan blade 116 can be attached, mounted, or otherwise coupled to a rotatable portion of the support platform 106 and disposed above the gearset 118. When the motor component 110 applies motive power through the gearset 118 to rotate the transparent cylinder 102, the fan blade 116 can also be configured to rotate in unison, and simultaneously, with the transparent cylinder 102 and the support component 112. In such embodiments, air (or conditioned air) can be drawn from an outside source (e.g., a passenger cabin of a vehicle or an air-conditioning unit) through a first set of vent holes 120 disposed concentrically around the support platform 106 on the base component of the housing 104. This creates an airflow inside of the sensor assembly 100. The airflow can exit the sensor assembly 100 through a second set of vent holes 122 disposed on the transparent cylinder 102 and near a top of the sensor assembly 100. In some embodiments, the airflow can remove heat generated from the LiDAR 108 and/or other sensors or components encased by the sensor assembly 100 while travelling through the sensor assembly 100. In some embodiments, the sensor assembly 100 can further include a circular cap 124 disposed above the transparent cylinder 102. The circular cap 124, in some embodiments, can include a lip 126 such that the airflow exiting the second set of vent holes 122 is converted or redirected into one or more downward air streams that travel along an outer surface of the transparent cylinder 102. In this way, the one or more downward air streams can provide an additional force to disperse obscurements (e.g., liquid droplets, condensation, debris, etc.) from the outer surface of the transparent cylinder 102. The downward air streams will be discussed in greater detail in reference to FIG. 2 herein.

In some embodiments, the sensor assembly 100 may be attached to an exterior of a vehicle (not shown in FIG. 1) such as an autonomous or semi-autonomous vehicle. Furthermore, the sensor assembly 100 can be integrated with one or more other vehicle systems. For example, a controller that controls the transparent cylinder 102 can be integrated with computing systems of an autonomous vehicle. In some embodiments, in addition to the LiDAR 108, the sensor assembly 100 can further include other sensors such as cameras. In such embodiments, the transparent cylinder 102 may additionally provide respective cameras with a FOV of an environment external to the sensor assembly 100. For example, the transparent cylinder 102 can provide a camera encased by the sensor assembly 100 with a FOV of an external environment. More specifically, each camera in the sensor assembly 100 may capture image data of an external environment (e.g., a portion of a surrounding environment of a vehicle) through a respective FOV provided by the transparent cylinder 102.

In some embodiments, a controller (not shown in FIG. 1) can be configured to transmit an actuation signal to the sensor assembly 100. The actuation signal can cause the sensor assembly 100 to initiate a rotation of the transparent cylinder 102. The controller can be implemented with any suitable type of control unit embodied in software, hardware, firmware, or a combination thereof. For example, the controller can be implemented with one or more application specific integrated circuits (ASICs), one or more field-programmable gate arrays (FPGAs), or some other customized computing chip or device. In some embodiments, the controller may be an electronic control unit of a vehicle such as an autonomous vehicle. In response to receiving the actuation signal from the controller, the motor component 110 can be activated and configured to provide motive power to the transparent cylinder 102 and the fan blade 116 through the gearset 118.

In some embodiments, the controller can transmit a series of actuation signals (e.g., "ON" signals) and deactivation signals (e.g., "OFF" signals) to the motor component 110 in accordance with an activation schedule that specifies a periodicity, a duration, and a rotational speed with which the transparent cylinder 102 and the fan blade 116 are to be rotated. In response to receiving such actuation signals from the controller, the motor component 110 can initiate a rotation of the transparent cylinder 102 as described above. In some embodiments, a rotation of the transparent cylinder 102 at a sufficient rotational speed for a sufficient duration can cause liquid, debris, or other obscurements to disperse from the transparent cylinder 102 due to centrifugal force that results from the rotation.

Figure 2:
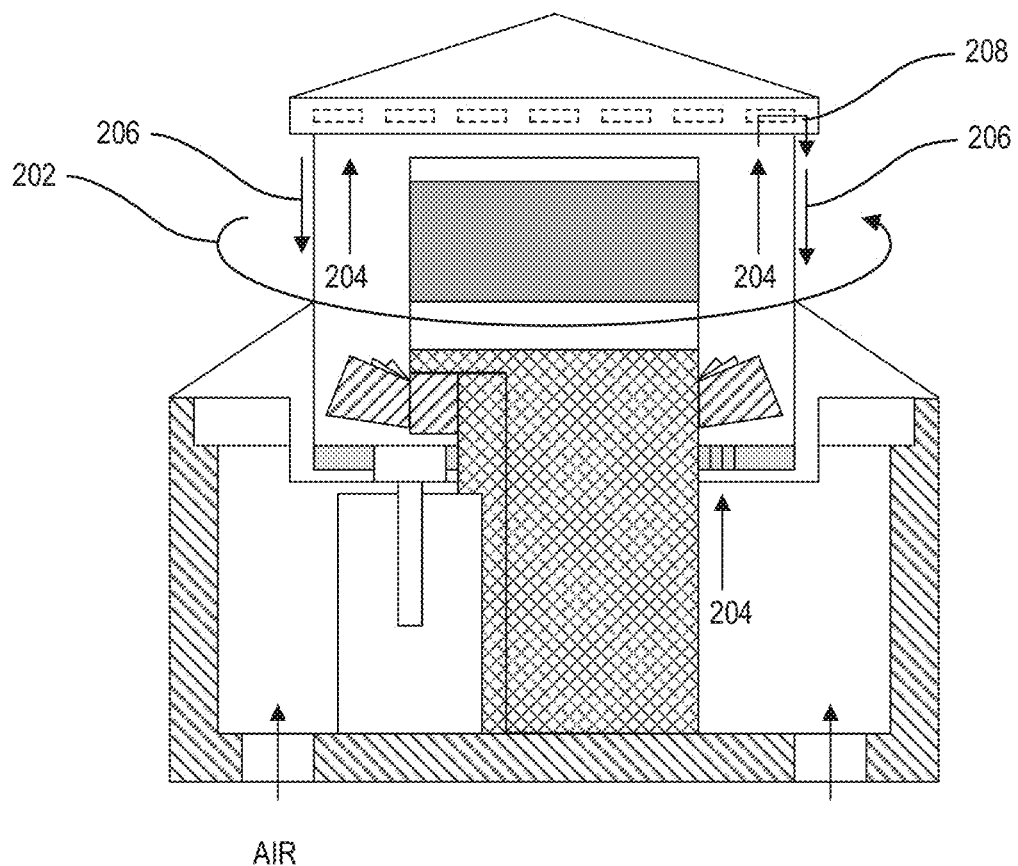
FIG. 2 illustrates a cross section of the sensor assembly depicted in FIG. 1, in accordance with various embodiments of the present invention.

FIG. 2 illustrates a cross section of the sensor assembly 100 in accordance with various embodiments of the present invention. FIG. 2 illustrates an airflow inside the sensor assembly 100 during a scenario in which an actuation signal transmitted from the controller to the sensor assembly 100 causes a rotation 202 of the transparent cylinder 102 and the fan blade 116. As discussed above, when the fan blade 116 is rotated, air can be drawn from an external source, such as a cabin of a vehicle or an air conditioning unit, into the sensor assembly 100 through the first set of vent holes 120. As result, an airflow 204 is generated in inside of the sensor assembly 100. In some embodiments, the airflow 204 can be a linear airflow travelling vertically through the inside of the sensor assembly 100. In some embodiments, the airflow 204 can be a circular airflow travelling concentrically, in a helix, through the inside of the sensor assembly 100. Whether the airflow 204 is linear or circular depends on shape or form of the fan blade 116. In general, the airflow 204 can remove heat generated from the LiDAR 108 and/or other components as the airflow 204 travels through the sensor assembly 100. The airflow 204 can exit from the sensor assembly 100 through the second set of vent holes 122. As the airflow 204 exits the sensor assembly 100, the airflow 204 is converted into one or more air streams. The one or more air streams are redirected 208 downwards into one or more downward air streams 206 through the lip 126 of the circular cap 124. The one or more downward air streams 206 travel along the outer surface of the transparent cylinder 102. These downward air streams can provide additional force to disperse liquids, debris, and/or other obscurements from the outer surface of the transparent cylinder 102. The one or more downward air streams 206 will be discussed in greater detail in reference to FIG. 2B herein.

Figure 3A:
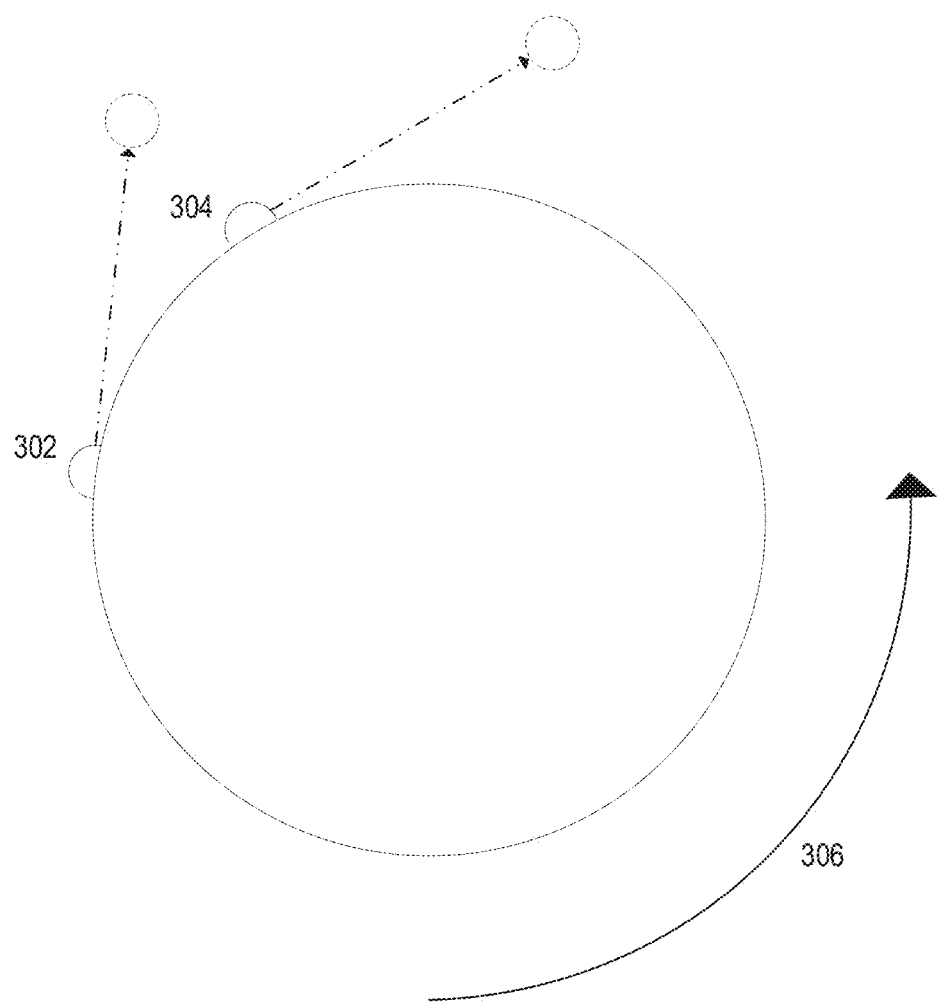
FIG. 3A illustrates a scenario in which a transparent cylinder of a sensor assembly is rotating to disperse obscurements from the transparent cylinder in accordance with various embodiments of the present invention.

FIG. 3A illustrates a scenario in which the transparent cylinder 102 of the sensor assembly 100, as illustrated in FIG. 1, is rotating to disperse obscurements from the transparent cylinder 102 in accordance with various embodiments of the present invention. FIG. 3A depicts a top view of the sensor assembly 100. For clarify and ease of understanding, only the transparent cylinder 102 of the sensor assembly 100 is shown in FIG. 3A. Other structural components such as the circular cap 124, the support component 112, etc. are not shown. In FIG. 3A, obscurements such as liquid droplets 302, 304 can accumulate on the outer surface of the transparent cylinder 102. This can occur, for example, when the sensor assembly 100 is mounted on a vehicle driving in a raining or wet condition. Upon detection of the liquid droplets 302, 304, the controller can transmit an actuation signal that causes the transparent cylinder 102 to rotate in a rotational direction 306. Depending on particular implementations, the rotational direction 306 may be clockwise or counter clock-wise. In some cases, the controller may transmit actuation signals to rapidly change the rotational direction 306 between a clock-wise direction and a counter clock-wise direction. Such an implementation may be advantageous to, for example, remove hard-to-remove obscurements such as mud from the outer surface of the transparent cylinder 102. Many variations are possible. As discussed above, the rotation of the transparent cylinder 102 generates centrifugal force that causes liquid droplets 302, 304 to be dispersed or spin away from the outer surface of the transparent cylinder 102. In this way, the transparent cylinder 102 can remove the liquid droplets 302, 304 that was obscuring a FOV of a sensor encased by the sensor assembly 100, and thus restoring clarity of the FOV for the sensor.

In some embodiments, a rotational speed with which to rotate the transparent cylinder 102 to generate sufficient centrifugal force to disperse the liquid droplets 302, 304 can be determined in accordance with following formula:

$$F = \frac{mv^2}{R}$$

where F is centrifugal force required to disperse the liquid droplets 302, 304; R is a radius of the transparent cylinder 102; m is a mass of a liquid droplet, which can be approximated as a water droplet having a mass of approximately 0.05 grams; and v is a cylindrical peripheral speed at the outer surface of the transparent cylinder 102. The centrifugal force required to disperse the liquid droplets 302, 304, F, can be approximated by using surface tension of water multiply by a circumference of a water droplet as shown below:

$$F = \gamma 2\pi r$$

where γ is surface tension of water at standard temperature and pressure, which is approximately 72.8 dyne per centimeter; and r is a radius of a water droplet, which can be approximated as 0.25 centimeter. The cylindrical peripheral speed at the outer surface of the transparent cylinder 102, v, can be expressed as follows:

$$v = 2\pi R\omega$$

where ω is the rotational speed with which to rotate the transparent cylinder 102. Putting it all together, the rotational speed with which to rotate the transparent cylinder 102 to generate sufficient centrifugal force disperse the liquid droplets 302, 304 can be expressed as follows:

$$\omega = \frac{\sqrt{\gamma 2\pi rR/m}}{2\pi R}$$

As such, ω is the lowest rotational speed with which to rotate the transparent cylinder 102 to disperse the liquid droplets 302, 304.

Figure 3B:
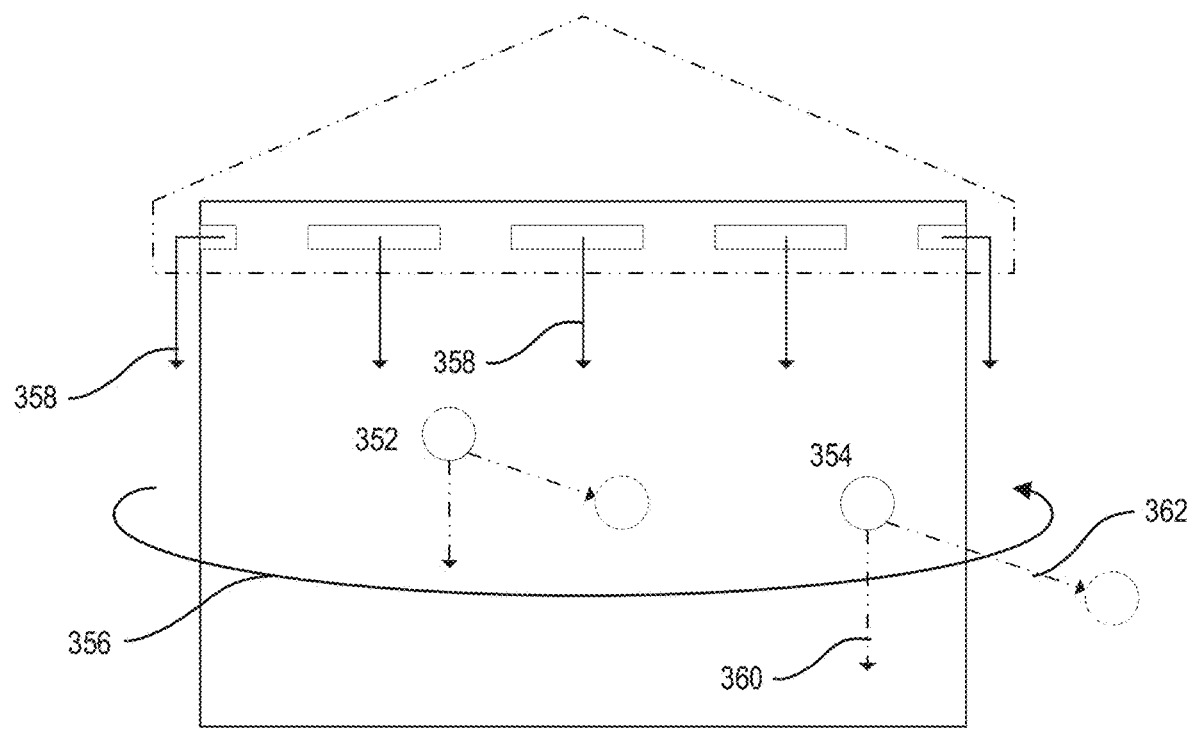
FIG. 3B illustrates another scenario in which a transparent cylinder of a sensor assembly is rotating to disperse obscurements from the transparent cylinder in accordance with various embodiments of the present invention.

FIG. 3B illustrates another scenario in which the transparent cylinder 102 of the sensor assembly 100 is rotating to disperse obscurements from the transparent cylinder 102 in accordance with various embodiments of the present invention. FIG. 3B depicts a side view of the sensor assembly 100. For clarity and ease of understanding, only the transparent cylinder 102 and the circular cap 124 of the sensor assembly 100 are shown. Other structural components such as the support component 112, the housing 104, etc. are not shown. In FIG. 3B, liquid droplets 352, 354 can accumulate on the outer surface of the transparent cylinder 102. This can occur, for example, when the rotating sensor assembly 100 is mounted on a vehicle driving in a raining or wet condition. Upon detection of the liquid droplets 352, 354, the controller can transmit an actuation signal to cause the transparent cylinder 102 to rotate in a rotational direction 356. In addition, the actuation signal can further cause the fan blade 116 (not shown) to rotate. As discussed in reference to FIG. 2 above, the rotation of the fan blade 116 can generate an airflow in inside of the sensor assembly 100. When the airflow exits the sensor assembly 100 through the second set of vent holes 122 and the lip 126 of the circular cap 124, one or more downward air streams 358 are generated. The one or more downward air streams 358 provide downward force 360 that helps in dispersing the liquid droplets 352, 354 away from the outer surface of the transparent cylinder 102. However, because the transparent cylinder 102 is rotating, the one or more downward air streams 358 and the rotation 356, together, actually cause the water droplets 352, 354 to disperse in a diagonal direction 362 away from the transparent cylinder 102. In this way, the transparent cylinder 102 can remove the liquid droplets 352, 354 that was obscuring a FOV of a sensor encased by the sensor assembly 100, and thus restoring clarity of the FOV for the sensor. In some cases, the one or more downward air streams 358 may help to defog or defrost the transparent cover 102 under a raining or winter condition.

Figure 4:
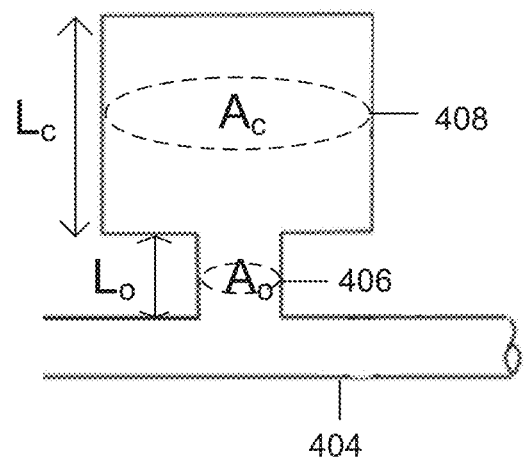
FIG. 4 illustrates an exemplary resonator to reduce noise resulting from an operation of the sensor assembly depicted in FIG. 1.

FIG. 4 illustrates an exemplary resonator 400 to reduce noise resulting from an operation of the sensor assembly 100 shown in FIG. 1. The resonator 400 may be directly, indirectly, or fluidly connected to a portion of the sensor assembly 100. The resonator 400 may comprise a tube 404, an opening 406 having a length $L_o$ and a cross-sectional area $A_o$ of the opening and a chamber 408 having a length $L_c$ and a cross-sectional area $A_c$ of the chamber 408. The chamber 408 may be analogous to a massless spring in a mechanical device, and the opening 406 may be analogous to a damper in the mechanical device. In some embodiments, the chamber 408 may be lined with one or more absorbent materials. In some embodiments, the resonator 400 may reduce or eliminate a particular frequency f of noise, and be designed with dimensions specifically configured to eliminate or reduce the particular frequency f of noise. In some embodiments, the controller as described with respect to FIG. 1 may determine the particular frequency f of noise that is generated as a result of the rotation of the transparent cylinder 102, the fan blade 116, and/or operation of other components of the sensor assembly 100. In some embodiments, the parameters $L_o$, $A_o$, $L_c$, and $A_c$ may be determined based on the following:

$$f = \frac{c}{2\pi}\sqrt{-\frac{3L_o + L_c A}{2L_o^3} + \sqrt{\left(\frac{3L_o + L_c A}{2L_o^3}\right)^2 + \frac{3A}{L_o^3 L_c}}} \quad \text{(Equation 1)}$$

$$f < 0.2756 \frac{c}{L_c} \quad \text{(Equation 2)}$$

$$A = \frac{A_c}{A_o} = \tan(kL_o) * \tan(kL_c), \quad \text{(Equation 3)}$$

In the above equations 1-3, A is an area ratio between the cross sectional area $A_o$ of the opening and the cross sectional area $A_c$ of the chamber, k is a wave number, and c is a speed of sound through the fluid or compressed air medium.

FIG. 4 illustrates an exemplary resonator 400 to reduce noise resulting from an operation of the sensor assembly 100 shown in FIG. 1. The resonator 400 may be directly, indirectly, or fluidly connected to a portion of the sensor assembly 100. The resonator 400 may comprise a tube 404, an opening 406 having a length $L_o$ and a cross-sectional area $A_o$ of the opening and a chamber 408 having a length $L_c$ and a cross-sectional area $A_c$ of the chamber 408. The chamber 408 may be analogous to a massless spring in a mechanical device, and the opening 406 may be analogous to a damper in the mechanical device. In some embodiments, the chamber 408 may be lined with one or more absorbent materials. In some embodiments, the resonator 400 may reduce or eliminate a particular frequency f of noise, and be designed with dimensions specifically configured to eliminate or reduce the particular frequency f of noise. In some embodiments, the controller as described with respect to FIG. 1 may determine the particular frequency f of noise that is generated as a result of the rotation of the transparent cylinder 102, the fan blade 116, and/or operation of other components of the sensor assembly 100.

Figure 5:
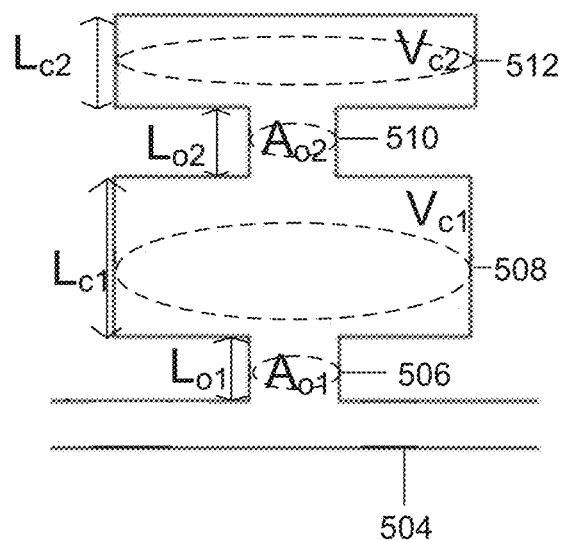
FIG. 5 illustrates an exemplary resonator to reduce noise resulting from an operation of the sensor assembly shown in FIG. 1.

FIG. 5 illustrates an exemplary resonator 500 to reduce noise resulting from an operation of the sensor assembly 100 shown in FIG. 1. The resonator 500 may be directly, indirectly, or fluidly connected to a portion of the sensor assembly 100. The resonator 500 may comprise a tube 504, a first opening 506 having a first length $L_{o1}$ and a first cross-sectional area $A_{o1}$ of the first opening 506 and a first chamber 508 having a first length $L_{c1}$, and a first volume $V_{c1}$ of the first chamber 508. The resonator may further comprise a second opening 510 having a second length $L_{o2}$ and a second cross-sectional area $A_{o2}$ of the second opening 510 and a second chamber 512 having a second length $L_{c2}$, and a second volume $V_{c2}$ of the second chamber 512. In some embodiments, the first chamber 508 and/or the second chamber 512 may be lined with one or more absorbent materials.

Figure 6:
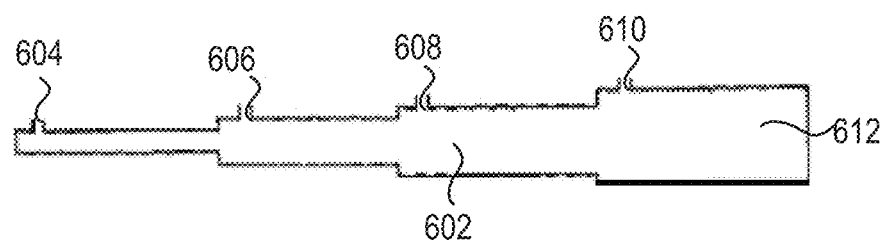
FIG. 6 illustrates an exemplary mechanical filter to reduce noise resulting from an operation of the sensor assembly shown in FIG. 1.

In some embodiments, the resonator 500 may reduce or eliminate particular frequencies $f_1$ and $f_2$ of noise, and be designed with dimensions specifically configured to eliminate or reduce the particular frequencies $f_1$ and $f_2$ of noise. In some embodiments, the controller as described with respect to FIG. 1 may determine the particular frequencies $f_1$ and $f_2$ of noise generated as a result of the rotation of the transparent cylinder 102, the fan blade 116, and/or operation of other components of the sensor assembly 100. In some embodiments, the parameters $L_{o1}$, $A_{o1}$, $L_{c1}$, $L_{o2}$, $A_{o2}$, $L_{c2}$, $V_{c1}$, and $V_{c2}$ may be determined based on the following:

FIG. 6 illustrates an exemplary mechanical filter 600 to reduce noise resulting from an operation of the sensor assembly 100 shown in FIG. 1. The mechanical filter 600 may be directly, indirectly, or fluidly connected to a portion of the sensor assembly 100. In some embodiments, as shown in FIG. 6, the mechanical filter 600 may comprise a series of different tapered pipes 602 with pressure sensing inlets 604, 606, 608, 610, distributed along its length and a microbarometer or barometer connected to its wide end 612. Successively larger diameters may acoustically scale coherent noise signals that propagate toward its wide end. Incoherent noise from the inlets that travels acoustically inside the pipe may be attenuated due to the scaling.

Figure 7:
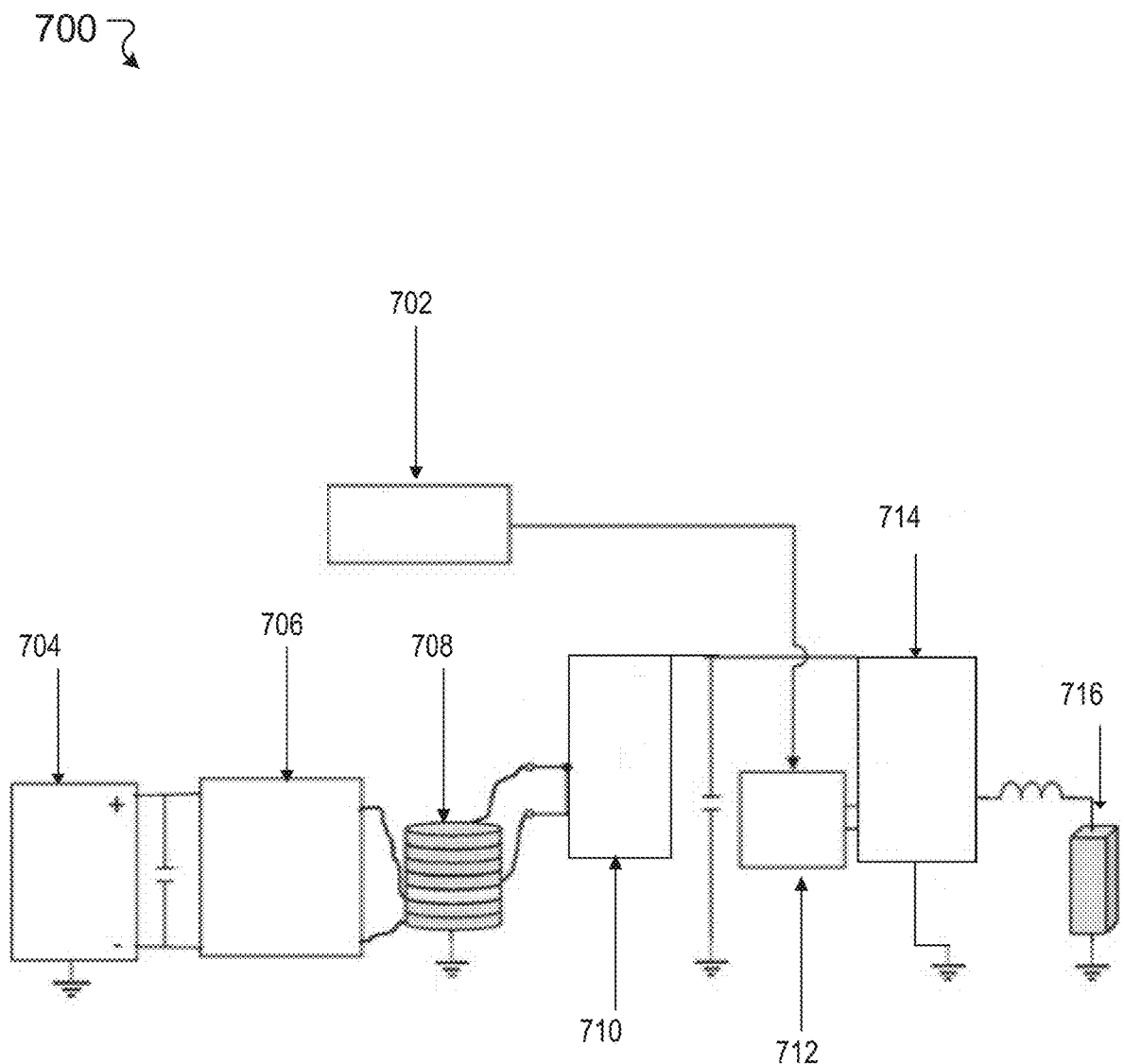
FIG. 7 illustrates an exemplary active damping system to reduce noise resulting from an operation of the sensor assembly shown in FIG. 1.

FIG. 7 illustrates an exemplary active damping system 700 to reduce noise resulting from an operation of the sensor assembly 100 shown in FIG. 1. The active damping system 700 may be directly, indirectly, or fluidly connected to a portion of the sensor assembly 100. In some embodiments, as shown in FIG. 7, the active damping system 700 may comprise one or more of, or all of, a vibration sensor 702, a DC battery 704, a first DC-AC inverter 706, a piezoelectric element 708, an AC-DC rectifier 710, a control circuit 712, a second DC-AC inverter 714, and a piezoelectric actuator 716. The active damping system 700 may form a resonance circuit with piezoelectric elements that may act as a capacitor, at least one additional capacitor, and one or more inductance elements or equivalents to reduce noise. As noise is inputted into the active damping system, the piezoelectric element 708, for example, may be excited at a frequency range centered on a resonance frequency of the noise and may generate a voltage. The generated voltage may be supplied to downstream circuit elements such as the AC-DC rectifier 710, the control circuit 712, the second DC-AC inverter 714, and the piezoelectric actuator 716. The control circuit 712, for example, may generate a signal having an opposite phase to cancel out or oppose the original generated voltage. The piezoelectric actuator 716 may output a force corresponding to the signal having the opposite phase to cancel out or oppose the noise.

$$f_{1,2} = \frac{c}{2\sqrt{(2\pi)}} \sqrt{\left(\frac{A_{o1}}{L_{o1}*V_{c1}} + \frac{A_{o2}}{L_{o2}*V_{c1}} + \frac{A_{o2}}{L_{o2}*V_{c2}}\right) \pm \sqrt{\left(\frac{A_{o1}}{L_{o1}*V_{c1}} + \frac{A_{o2}}{L_{o2}*V_{c1}} + \frac{A_{o2}}{L_{o2}*V_{c2}}\right)^2 - 4\frac{A_{o1}}{L_{o1}*V_{c1}}\frac{A_{o2}}{L_{o2}*V_{c1}}}} \quad \text{(Equation 4)}$$

$$V_{c1} = \frac{8A_{o1}^2 A_{o2} c^4}{L_{o1}\left(2A_{o1}A_{o2}c^2 f_1^2 + 2A_{o1}A_{o2}c^2 f_2^2 - \sqrt{\left(4A_{o1}^2 A_{o2}^2 c^4 f_1^4 - 8A_{o1}^2 A_{o2}^2 c^4 f_1^2 f_2^2 + 4A_{o1}^2 A_{o2}^2 c^4 f_2^4 - \frac{16A_{o1}A_{o2}^3 L_{o1} f_1^2 f_2^2 c^4}{L_{o2}}\right)}\right)} + \quad \text{(Equation 5)}$$

$$\frac{8A_{o2}^2 A_{o1} c^4}{L_{o2}\left(2A_{o1}A_{o2}c^2 f_1^2 + 2A_{o1}A_{o2}c^2 f_2^2 - \sqrt{\left(4A_{o1}^2 A_{o2}^2 c^4 f_1^4 - 8A_{o1}^2 A_{o2}^2 c^4 f_1^2 f_2^2 + 4A_{o1}^2 A_{o2}^2 c^4 f_2^4 - \frac{16A_{o1}A_{o2}^3 L_{o1} f_1^2 f_2^2 c^4}{L_{o2}}\right)}\right)}$$

$$V_{c2} = \frac{\left(A_{o1}A_{o2}c^2 f_1^2 + A_{o1}A_{o2}c^2 f_2^2\right)}{f_1^2 f_2^2 (A_{o2}L_{o1} + A_{o1}L_{o2})} - \quad \text{(Equation 6)}$$

$$\frac{0.5\sqrt{4A_{o1}^2 A_{o2}^2 c^4 f_1^4 + 8A_{o1}^2 A_{o2}^2 c^4 f_1^2 f_2^2 + 4A_{o1}^2 A_{o2}^2 c^4 f_2^4 - \frac{16A_{o1}A_{o2}^3 L_{o1} f_1^2 f_2^2 c^4 + 16A_{o1}^2 A_{o2}^2 L_{o2} f_1^2 f_2^2 c^4}{L_{o2}}}}{f_1^2 f_2^2 (A_{o2}L_{o1} + A_{o1}L_{o2})}$$

$$\frac{f_1^2}{f_2^2} + \frac{f_2^2}{f_1^2} \geq 2 + \frac{4A_{o2}L_{o1}}{A_{o1}L_{o2}} \quad \text{(Equation 7)}$$

In the above equations 4-7, c is a speed of sound through the fluid or compressed air medium.

Voltage from the DC battery 704 may be fed to the first DC-AC inverter 706, which may be a resonant inverter to drive the piezoelectric element 708. A frequency of the first DC-AC inverter 706 may be determined to match a first mechanical resonance of the piezoelectric element 708. The piezoelectric element 708 may vibrate at its fundamental radial mode and generate an AC output voltage which may be maintained to be constant. As an example, a feedback frequency tracking circuit between an input and output of the piezoelectric element 708 may maintain the AC output voltage of the piezoelectric element 708 to be constant. The output voltage from the piezoelectric element 708 may be rectified using the AC-DC rectifier 710. The AC-DC rectifier 710 may comprise a single-phase diode bridge rectifier. The output voltage from the piezoelectric element 708 may be filtered through a capacitor. The DC voltage from the AC-DC rectifier 710 may be switched to an AC signal using the second DC-AC inverter 714, for example, using pulse width modulation. The resulting AC signal may be an adjustable magnitude and adjustable frequency AC signal. A capacitor between the AC-DC rectifier 710 and the second DC-AC inverter 714 may be an energy storage element to actuate as a DC link. The resulting AC signal may be filtered through an inductance, for example, to eliminate components such as high frequency components, and sent to the piezoelectric actuator 716.

Figure 8:
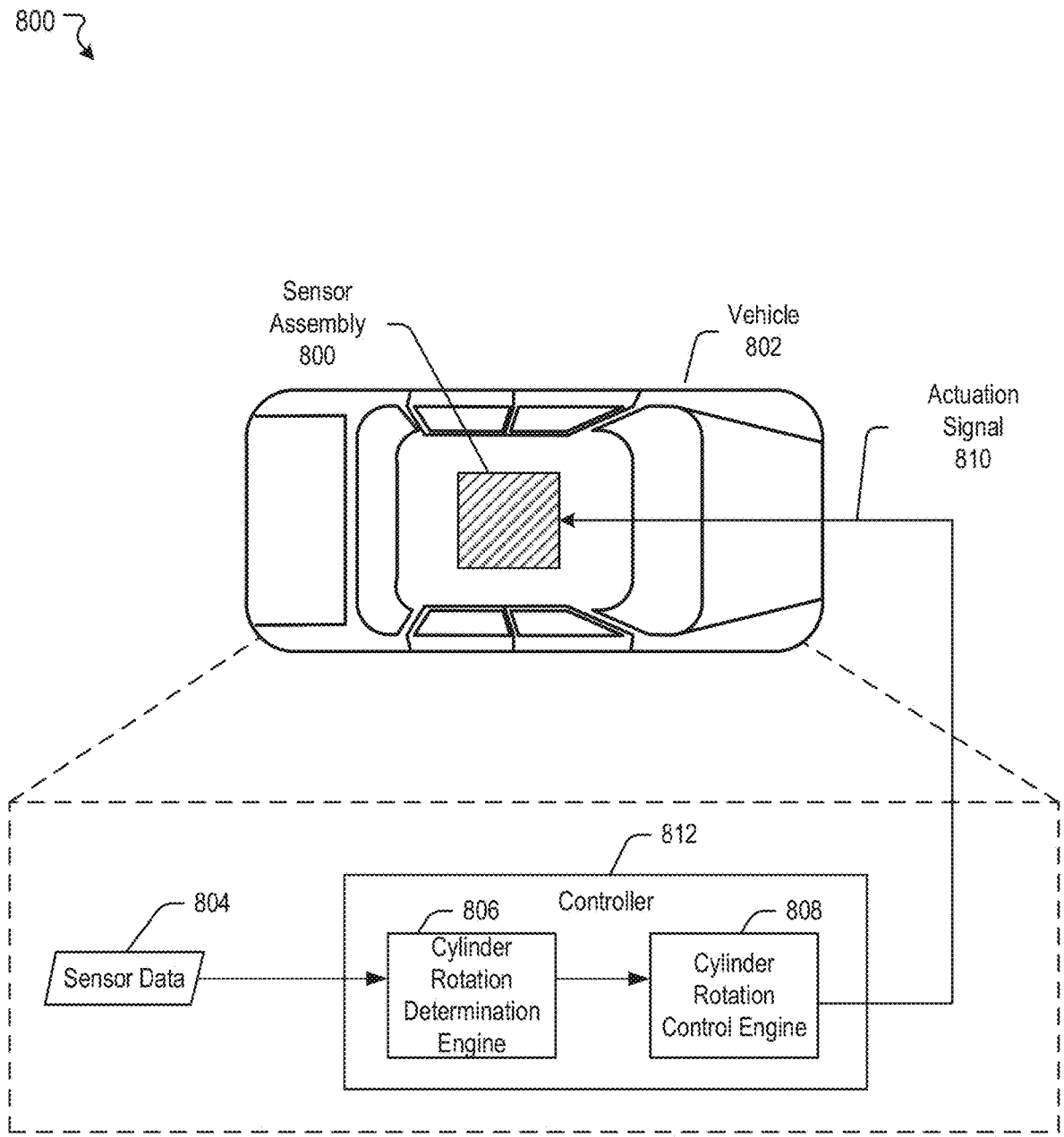
FIG. 8 is a schematic and data flow diagram illustrating control of a sensor assembly in accordance with various embodiments of the present invention.
Figure 9:
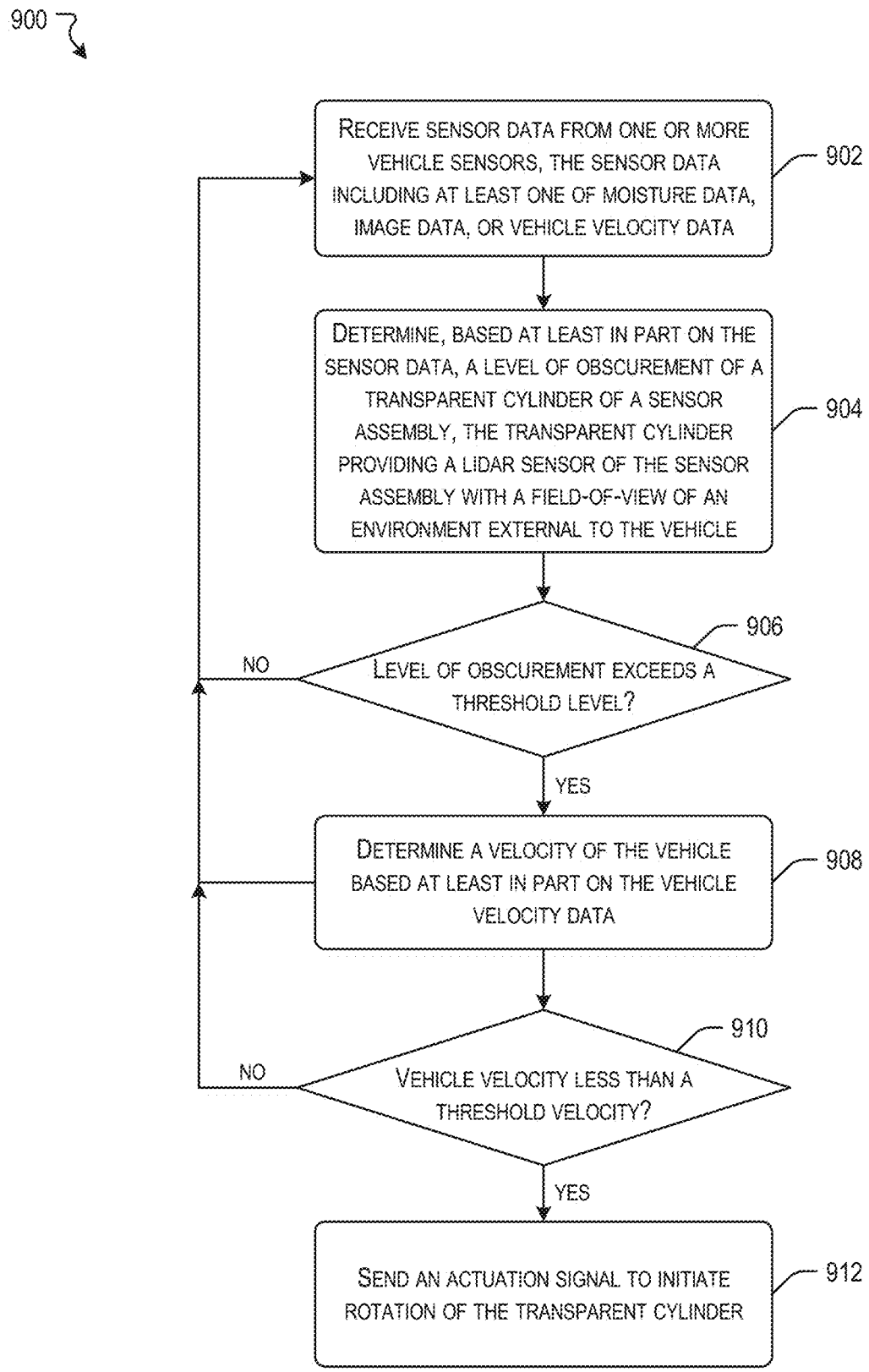
FIG. 9 is a flow diagram of a method for controlling operation of a sensor assembly in accordance with various embodiments of the present invention.
Figure 10:
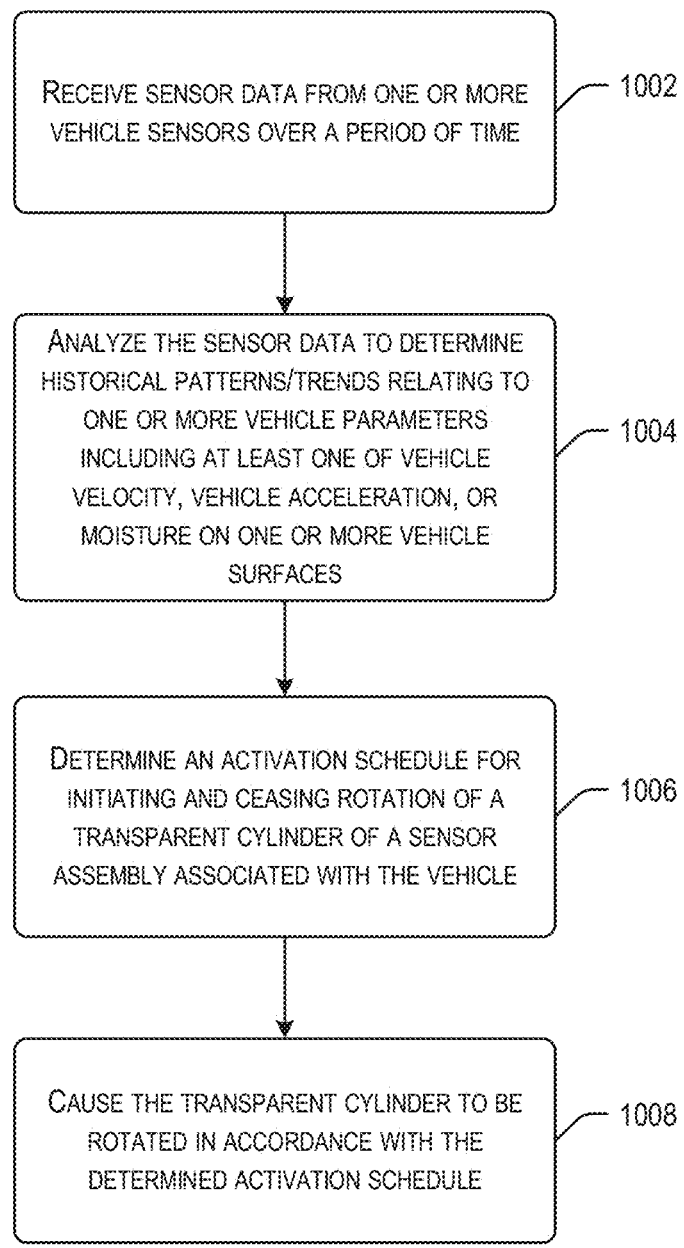
FIG. 10 is a flow diagram of a method for determining an activation schedule for controlling operation of a sensor assembly in accordance with various embodiments of the present invention.

FIG. 8 is a schematic and data flow diagram illustrating control of a sensor assembly in accordance with various embodiments of the present invention. FIG. 9 is a flow diagram of a method 900 for controlling operation of a sensor assembly (e.g., the sensor assembly 100 of FIG. 1) in accordance with various embodiments of the present invention. FIG. 10 is a flow diagram of a method 1000 for determining an activation schedule for controlling operation of a sensor assembly (e.g., the sensor assembly 100 of FIG. 1) in accordance with various embodiments of the present invention. Each of FIG. 9 and FIG. 10 will be described in conjunction with FIG. 8 hereinafter.

Figure 11:
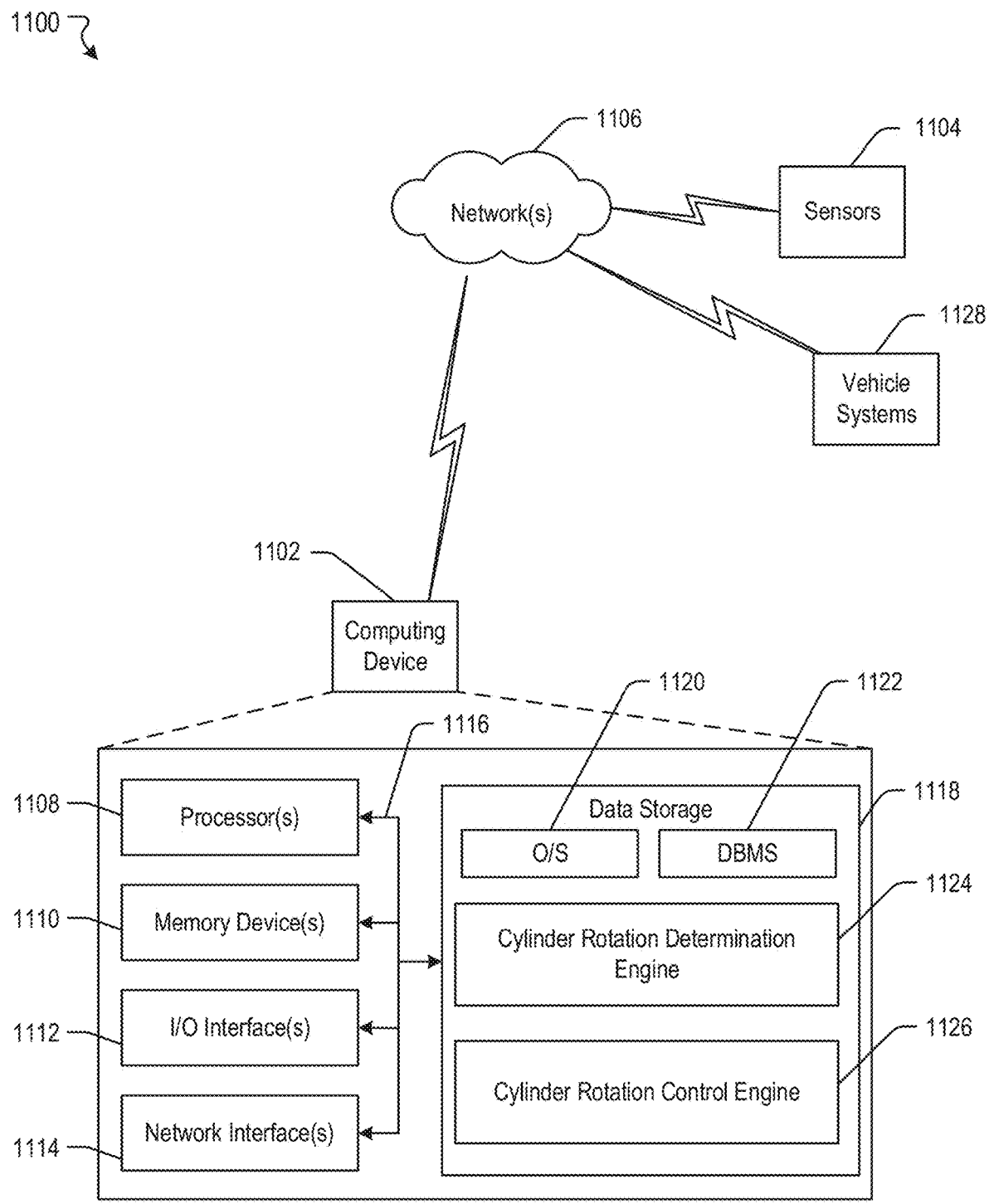
FIG. 11 is a schematic block diagram of an example networked architecture configured to implement various embodiments of the present invention.

Each operation of the method 900 and/or the method 1000 can be performed by one or more engines depicted in FIG. 8 or FIG. 11. These engines can be implemented in any combination of hardware, software, and/or firmware. In some embodiments, the one or more engines can be implemented, at least in part, as software and/or firmware modules that include computer-executable instructions that when executed by a processing circuit cause one or more operations to be performed. In some embodiments, these engines may be customized computer-executable logic implemented within a customized computing chip such as an ASIC or FPGA. A system or device described herein as being configured to implement embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring now to FIG. 9 in conjunction with FIG. 8, at block 902 of the method 900, sensor data 804 can be received from various sensors associated with a vehicle 802, which may be an autonomous vehicle. The sensor data 804 can include, for example, moisture data received from a moisture or rain sensor, vehicle velocity data, and so forth. The sensor data 804 may further include, without limitation, image data from a camera, radar data from a radar, LiDAR data from a LiDAR (e.g., the LiDAR 108) encased by a sensor assembly (e.g., the sensor assembly 100), and so forth. In some embodiments, the sensor data 804 may include one or both of the moisture data and the image data. Further, in some embodiments, the moisture data may be indicative of a moisture level of a transparent cylinder (e.g., the transparent cylinder 102) of the sensor assembly. For example, if the vehicle 802 is being operated in a raining or wet condition, the moisture data may indicate a high moisture level due to presence of rain droplets/streams of water on the transparent cylinder. In some embodiments, the image data may reflect images captured by the camera through the transparent cylinder. If the transparent cylinder contains obscurements (e.g., dust/other debris, liquid droplets, streams of liquid, etc.) that obscure a FOV of the camera, then the image may be of poor quality. Similarly, in some embodiments, the LiDAR data may reflect LiDAR images captured by the LiDAR through the transparent cylinder. If the transparent cylinder contains obscurements (e.g., dust/other debris, liquid droplets, streams of liquid, etc.) that obscure a FOV of the LiDAR, then the LiDAR image may be of poor quality.

At block 904 of the method 900, a cylinder rotation determination engine 806 (which may be executing on a computing device such as an embedded controller 812 provided locally in the vehicle 802 or on a remote server) may determine a level of obscurement of the transparent cylinder based at least in part on the sensor data 804. For example, in some embodiments, a cylinder rotation determination engine 806 may determine a level of obscurement based on moisture data that is indicative of a moisture level of the transparent cylinder. If, for example, a vehicle (e.g., the vehicle 802) is being operated in a raining condition, moisture data may indicate a high moisture level due to rain droplets on the transparent cylinder. As such, a level of obscurement may be correlated to a moisture level indicated by the moisture data. For example, as a moisture level increases, a determined level of obscurement of the transparent cylinder may proportionally increase.

In some embodiments, the cylinder rotation determination engine 806 may determine a level of obscurement based on the image data included in the sensor data 804. The image data may indicate an obscured view of the camera through the transparent cylinder. Similar to the moisture level, a degree of impairment in clarity of the image data due to debris or liquid present on the transparent cylinder may be indicative of a level of obscurement of the transparent cylinder. That is, as a degree of impairment in the clarity of the image data increases, a level of obscurement of the transparent cylinder may proportionately increase. In some embodiments, the cylinder rotation determination engine 806 may assess a level of obscurement of the transparent cylinder by comparing an image quality of an image captured through the transparent cylinder to a baseline image having at least a threshold level of image quality. The baseline image may represent the maximum level of obscurement permitted to ensure safe autonomous vehicle operation. In some embodiments, the baseline image may represent an ideal image with no obscurement of the transparent cylinder. In some embodiments, the cylinder rotation determination engine 806 may determine an extent to which an image quality of a captured image deviates from an image quality of the baseline image, and may correlate this deviation to a corresponding level of obscurement of the transparent cylinder.

Then, at decision 906 of the method 900, the cylinder rotation determination engine 806 may determine whether a level of obscurement of the transparent cylinder exceeds a threshold level. If a level of obscurement of the transparent cylinder does not exceed the threshold value, a negative determination may be made at the decision 906, and the method 900 may continue iteratively from block 902, where additional sensor data is received. If, on the other hand, the transparent cylinder is obscured beyond the threshold level (a positive determination at decision 906), the cylinder rotation determination engine 806 may optionally further evaluate a vehicle velocity in relation to a threshold vehicle velocity. In some embodiments, a level of obscurement of the transparent cylinder and its relation to the threshold level may alone determine whether the sensor assembly is activated. In still some embodiments, the vehicle velocity and its relation to the threshold velocity may alone determine whether the sensor assembly is activated.

In some embodiments, if only one of the above-described conditions is met (e.g., only a level of obscurement exceeds a threshold level or only a vehicle velocity is less than a threshold velocity), a deviation between a corresponding parameter and a threshold value may need to exceed a certain value in order to cause the transparent cylinder to rotate. For example, in some embodiments, if a vehicle velocity is above a threshold velocity, a level of obscurement of the transparent cylinder may need to exceed a threshold level by more than a predetermined value (or vice versa) before the sensor assembly is activated to cause the transparent cylinder to rotate. In some embodiments, if, for example, a vehicle velocity exceeds a threshold velocity by an amount x, then the level of obscurement of the transparent cylinder may need to exceed the threshold level by at least kx, where k is a multiplicative factor that can take on any real number value greater than 1, or vice versa.

In some embodiments, rather than actuating a motor component (e.g., the motor component 110) to initiate a rotation of the transparent cylinder when a level of obscurement exceeds a threshold level, the sensor assembly may be triggered when the level of obscurement is within a first percentage of the threshold level. Similarly, in some embodiments, the sensor assembly may be triggered when a vehicle velocity is within a second percentage of a threshold velocity.

In some embodiments, a rotational speed with which to rotate the transparent cylinder may be a function of how close a level of obscurement of the transparent cylinder or a vehicle velocity is to a threshold obscurement level or threshold velocity, respectively, whichever the case may be. For example, a rotational speed may be at a maximum permissible level if a level of obscurement exceeds the threshold and/or a vehicle velocity is below the threshold velocity. Then, for any level of obscurement less than the threshold level, a reduction in the maximum permissible rotational speed may be proportional to a difference between the level of obscurement and the threshold level. For example, if a level of obscurement of the transparent cylinder is 20% percent less than the threshold level, a rotational speed may be 80% of the maximum permissible level. Similarly, for any vehicle velocity above the threshold velocity, the reduction in the maximum permissible rotational speed may be proportional to the difference between the vehicle velocity and the threshold velocity. For example, if a vehicle velocity is 30% percent above the threshold velocity, then a rotational speed may be 70% of the maximum permissible speed. It should be appreciated that values of other parameters such as duration, number of independent rotations of the transparent cylinder within a given amount of time, or the like may additionally, or alternatively, may be proportional to the deviation between a level of obscurement of the transparent cylinder and a threshold level or a deviation between a vehicle velocity and a threshold velocity.

Referring again to FIG. 9, at block 908 of the method 900, the cylinder rotation determination engine 806 may determine a velocity of the vehicle 802 from vehicle velocity data included in the sensor data 804. It should be appreciated that velocity, as that term is used herein, may simply connote a speed of the vehicle 802 (e.g., a scalar quantity) or a speed and a direction of the vehicle 802 (e.g., a vector quantity). Then, at decision 910 of the method 900, the cylinder rotation determination engine 806 may determine whether the velocity of the vehicle 802 is less than a threshold velocity. If the vehicle velocity is determined to be less than the threshold vehicle velocity (a positive determination at block 910)—which may indicate that the vehicle velocity is insufficient to generate enough naturally circulating wind around the transparent cylinder to produce a desired cleaning effect—a cylinder rotation control engine 810 may send an actuation signal 810 to the sensor assembly at block 912 to initiate a rotation of the transparent cylinder. A cylinder rotation control engine 808 may execute on a computing device such as the embedded controller 812 provided locally in the vehicle 802 or on a remote server.

FIG. 9 describes the data and criteria that are evaluated to determine whether to actuate motive power to cause a transparent cylinder of a sensor assembly to rotate. FIG. 10 describes a process for determining an activation schedule that specifies when and for how long to initiate a rotation of a transparent cylinder. In particular, in some embodiments, the activation schedule may specify a timing with which to initiate and/or cease a rotation of the transparent cylinder.

Referring now to FIG. 10, at block 1002 of the method 1000, the cylinder rotation determination engine 806 may receive sensor data from one or more vehicle sensors over a period of time. The received sensor data may include the sensor data 802. The period of time may be selected so as to ensure that a sufficient amount of historical data is assessed at block 1004 of the method 1000. The sensor data received at block 1002 may include data relating to one or more parameters associated with operation of the vehicle 802. The sensor data received at block 1002 may include, without limitation, velocity data, acceleration data, rotational movement data, vibrational data, vehicle braking data, image data, LiDAR data, moisture data, and so forth.

Then, at block 1004 of the method 1000, the cylinder rotation determination engine 806 may analyze the received sensor data to determine historical patterns/trends present in the data. For example, in some embodiments, the cylinder rotation determination engine 806 may analyze the received sensor data to determine whether any historical moisture and/or vehicle velocity trends are present. For example, if the moisture data indicates that moisture levels of the transparent cylinder are continuously trending upwards but have not yet reached a level that would cause a level of obscurement of the transparent cylinder to exceed a threshold level, the cylinder rotation determination engine 806 may nonetheless determine that the sensor assembly should be activated to cause the transparent cylinder to rotate in anticipation that the moisture level will continue to rise and the level of obscurement will exceed the threshold level in the near future. The cylinder rotation determination engine 806 may similarly evaluate the vehicle velocity data to determine if any similar trends are present in that data. For example, if the velocity data indicates that the vehicle is continuously decelerating, the cylinder rotation determination engine 806 may predict that a velocity of the vehicle 802 will be below the threshold velocity in the near future, and as a result, may proactively trigger a rotation of the transparent cylinder.

In some embodiments, the cylinder rotation determination engine 806 may determine historical trends relating to, for example, a time of day or driving conditions under which the transparent cylinder is more likely to become obscured. For example, it may be determined that liquid/moisture tends to accumulate to a greater extent during certain days of the week, certain times of the day, certain elevations, certain geographic areas, and so forth. As another non-limiting example, the cylinder rotation determination engine 806 may determine historical trends relating to other vehicle operating conditions such as driver behavior for a human operated vehicle or road conditions, traffic conditions, routes taken, or the like for autonomous vehicles.

Then, at block 1006 of the method 1000, the cylinder rotation determination engine 806 may determine an activation schedule for initiating and ceasing rotation of the transparent cylinder. In particular, the cylinder rotation determination engine 806 may determine the activation schedule based on the historical patterns/trends identified at block 1004. That is, in some embodiments, rather than dynamically triggering the sensor assembly when a level of obscurement of the transparent cylinder exceeds a threshold level and/or a vehicle velocity is below a threshold velocity, the transparent cylinder may be caused to rotate in accordance with a predetermined activation schedule. The activation schedule may be determined based on the identified historical patterns/trends relating to one or more vehicle parameters. It should be appreciated, however, that the activation schedule can be updated to reflect changes in the patterns/trends and/or based on dynamic changes to the vehicle operating conditions. Finally, at block 1008 of the method 1000, the cylinder rotation control engine 808 may send an actuation signal (or multiple actuation and deactivation signals) to cause the sensor assembly to operate in accordance with the determined activation schedule.

As a non-limiting example of determining an activation schedule based on historical patterns/trends, if a driver tends to operate a vehicle at higher speeds in wet conditions, it may not be necessary to initiate a rotation of the transparent cylinder at a high rotational speed or for a long duration as it may be in a scenario involving a driver who tends to operate a vehicle at slower speeds in wet conditions. As another example, a vehicle that tends to be operated in wetter or dirtier environments may be associated with an activation schedule that involves rotating the transparent cylinder a greater number of times during a given time period; at a higher rotational speed; and/or for a longer duration. As yet another example, if a vehicle tends to be operated in high traffic areas and/or during peak traffic times, and thus, tends to operate at a lower average velocity, a corresponding activation schedule for the vehicle may specify that the transparent cylinder to be rotated a greater number of times during a given time period; at a higher rotational speed; and/or for a longer duration. It should be appreciated that numerous other historical patterns/trends as well as corresponding activation schedules are contemplated.

Hardware Implementation

FIG. 11 is a schematic block diagram of an example networked architecture 1100 configured to implement various embodiments of the present invention. The networked architecture 1100 can include one or more special-purpose computing devices 1102 communicatively coupled via one or more networks 1106 to various sensors 1104 and other vehicle systems 1128. In example embodiments, the sensors 1104 may include any of the example types of on-board vehicle sensors previously described including, without limitation, LiDAR sensors, radars, cameras, GPS receivers, sonar-based sensors, IMUs, accelerometers, gyroscopes, magnetometers, FIR sensors, and so forth. The special-purpose computing device(s) 1102 may include devices that are integrated with a vehicle and may receive sensor data from the sensors 1104 via a local network connection (e.g., WiFi, Bluetooth, Dedicated Short Range Communication (DSRC), or the like). In other example embodiments, the special-purpose computing device(s) 1102 may be provided remotely from a vehicle and may receive the sensor data from the sensors 1104 via one or more long-range networks. The vehicle system(s) 1128 may include sensor assembly cleaning apparatuses described herein. Further, the vehicle system(s) 1128 may additionally include an in-vehicle infotainment system or other mechanical and/or electrical systems of a vehicle.

The special-purpose computing device(s) 1102 may be hard-wired to perform the techniques described herein; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 1102 may also combine custom hard-wired logic, ASICs, or FPGAs with custom programming to accomplish the techniques. The special-purpose computing device(s) 1102 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 1120, such as iOS, Android, Chrome OS, Windows XP, Windows Vista, Windows 7, Windows 6, Windows Server, Windows CE, Unix, Linux, SunOS, Solaris, iOS, Blackberry OS, VxWorks, or other compatible operating systems. In other embodiments, the computing device(s) 1102 may be controlled by a proprietary operating system. The operating system software 1120 may control and schedule computer processes for execution; perform memory management; provide file system, networking, and I/O services; and provide user interface functionality, such as a graphical user interface ("GUI").

While the computing device(s) 1102, the sensors 1104, and/or the vehicle system(s) 1126 may be described herein in the singular, it should be appreciated that multiple instances of any such component can be provided and functionality described in connection any particular component can be distributed across multiple instances of such a component. In certain example embodiments, functionality described herein in connection with any given component of the architecture 1100 can be distributed among multiple components of the architecture 1100. For example, at least a portion of functionality described as being provided by a computing device 1102 may be distributed among multiple such computing devices 1102.

The network(s) 1106 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 1106 can have any suitable communication range associated therewith and can include, for example, global networks (e.g., the Internet), metropolitan area networks (MANs), wide area networks (WANs), local area networks (LANs), or personal area networks (PANs). In addition, the network(s) 1106 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 1102 can include one or more processors (processor(s)) 1106, one or more memory devices 1110 (generically referred to herein as memory 1110), one or more input/output ("I/O") interface(s) 1112, one or more network interfaces 1114, and data storage 1116. The computing device 1102 can further include one or more buses 1116 that functionally couple various components of the computing device 1102. The computing device 1102 may also include various engines including a cylinder rotation determination engine 1124 and a cylinder rotation control engine 1126. These engines may be implemented in any combination of software, hardware, or firmware. While these engines are illustratively depicted as software/firmware modules stored in the data storage 1116, it should be appreciated that the engines may include hard-wired logic, customized logic of a persistently programmed customized computing device such as an ASIC or FPGA, or the like. Each of the engines may include logic for performing any of the processes and tasks described earlier in connection with correspondingly named engines.

The bus(es) 1116 can include at least one of a system bus, a memory bus, an address bus, or a message bus, and can permit the exchange of information (e.g., data (including computer-executable code), signaling, etc.) between various components of the computing device 1102. The bus(es) 1116 can include, without limitation, a memory bus or a memory controller, a peripheral bus, an accelerated graphics port, and so forth. The bus(es) 1116 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1110 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 1110 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1110 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 1116 can include removable storage and/or non-removable storage including, but not limited to, magnetic storage, optical disk storage, and/or tape storage. The data storage 1116 can provide non-volatile storage of computer-executable instructions and other data. The memory 1110 and the data storage 1116, removable and/or non-removable, are examples of computer-readable storage media (CRSM) as that term is used herein. The data storage 1116 can store computer-executable code, instructions, or the like that can be loadable into the memory 1110 and executable by the processor(s) 1106 to cause the processor(s) 1106 to perform or initiate various operations. The data storage 1116 can additionally store data that can be copied to memory 1110 for use by the processor(s) 1106 during the execution of the computer-executable instructions. Moreover, output data generated as a result of execution of the computer-executable instructions by the processor(s) 1106 can be stored initially in memory 1110 and can ultimately be copied to data storage 1116 for non-volatile storage.

More specifically, the data storage 1116 can store one or more operating systems (O/S) 1120 and one or more database management systems (DBMS) 1122 configured to access the memory 1110 and/or one or more external datastore(s) potentially via one or more of the networks 1106. In addition, the data storage 1116 may further store one or more program modules, applications, engines, computer-executable code, scripts, or the like. For instance, any of the engines described herein may be implemented as software and/or firmware that includes computer-executable instructions (e.g., computer-executable program code) loadable into the memory 1110 for execution by one or more of the processor(s) 1106 to perform any of the techniques described herein.

Although not depicted in FIG. 11, the data storage 1116 can further store various types of data utilized by engines of the computing device 1102. Such data may include, without limitation, sensor data (e.g., temperature data, vehicle velocity data, moisture data, etc.); map data; threshold values; and so forth. Any data stored in the data storage 1116 can be loaded into the memory 1110 for use by the processor(s) 1106 in executing computer-executable program code. In addition, any data stored in the data storage 1116 can potentially be stored in one or more external datastores that are accessible via the DBMS 1122 and loadable into the memory 1110 for use by the processor(s) 1106 in executing computer-executable instructions/program code.

The processor(s) 1106 can be configured to access the memory 1110 and execute computer-executable instructions/program code loaded therein. For example, the processor(s) 1106 can be configured to execute computer-executable instructions/program code of the various program modules to cause or facilitate various operations to be performed in accordance with one or more embodiments of the invention. The processor(s) 1106 can include any suitable processing unit capable of accepting data as input, processing the input data in accordance with stored computer-executable instructions, and generating output data.

The processor(s) 1106 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1106 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1106 can be made capable of supporting any of a variety of instruction sets.

Referring now to other illustrative components depicted as being stored in the data storage 1116, the O/S 1120 can be loaded from the data storage 1116 into the memory 1110 and can provide an interface between other application software executing on the computing device 1102 and hardware resources of the computing device 1102. More specifically, the O/S 1120 can include a set of computer-executable instructions for managing hardware resources of the computing device 1102 and for providing common services to other application programs. In certain example embodiments, the O/S 1120 can include or otherwise control execution of one or more of the program modules stored in the data storage 1116. The O/S 1120 can include any operating system now known or which can be developed in the future including, but not limited to, any server operating system, any mainframe operating system, or any other proprietary or non-proprietary operating system.

The DBMS 1122 can be loaded into the memory 1110 and can support functionality for accessing, retrieving, storing, and/or manipulating data stored in the memory 1110, data stored in the data storage 1116, and/or data stored in external datastore(s). The DBMS 1122 can use any of a variety of database models (e.g., relational model, object model, etc.) and can support any of a variety of query languages. The DBMS 1122 can access data represented in one or more data schemas and stored in any suitable data repository. Datastore(s) that may be accessible by the computing device 1102 via the DBMS 1122, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 1102, the input/output (I/O) interface(s) 1112 can facilitate the receipt of input information by the computing device 1102 from one or more I/O devices as well as the output of information from the computing device 1102 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 1102 or can be separate therefrom. The I/O devices can further include, for example, any number of peripheral devices such as data storage devices, printing devices, and so forth.

The I/O interface(s) 1112 can also include an interface for an external peripheral device connection such as universal serial bus (USB), FireWire, Thunderbolt, Ethernet port or other connection protocol that can connect to one or more networks. The I/O interface(s) 1112 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 1102 can further include one or more network interfaces 1114 via which the computing device 1102 can communicate with any of a variety of other systems, platforms, networks, devices, and so forth. The network interface(s) 1114 can enable communication, for example, with the sensors 1104 and/or one or more other devices via one or more of the network(s) 1106. In example embodiments, the network interface(s) 1114 provide a two-way data communication coupling to one or more network links that are connected to one or more of the network(s) 1106. For example, the network interface(s) 1114 may include an integrated services digital network (ISDN) card, a cable modem, a satellite modem, or a modem to provide a data communication connection to a corresponding type of telephone line. As another non-limiting example, the network interface(s) 1114 may include a local area network (LAN) card to provide a data communication connection to a compatible LAN (or a wide area network (WAN) component to communicate with a WAN). Wireless links may also be implemented. In any such implementation, the network interface(s) 1114 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 1104 and the signals on network links and through the network interface(s) 1114, which carry the digital data to and from the computing device 1102, are example forms of transmission media. In example embodiments, the computing device 1102 can send messages and receive data, including program code, through the network(s) 1106, network links, and network interface(s) 1114. For instance, in the Internet example, a server might transmit a requested code for an application program through the Internet, the ISP, a local network, and a network interface 1114. The received code may be executed by a processor 1106 as it is received, and/or stored in the data storage 1116, or other non-volatile storage for later execution.

It should be appreciated that the engines depicted in FIG. 11 as part of the computing device 1102 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 1102 and/or hosted on other computing device(s) accessible via one or more of the network(s) 1106, can be provided to support functionality provided by the engines depicted in FIG. 11 and/or additional or alternate functionality. In addition, engines that support functionality described herein can be implemented, at least partially, in hardware and/or firmware and can be executable across any number of computing devices 1102 in accordance with any suitable computing model such as, for example, a client-server model, a peer-to-peer model, and so forth.

It should further be appreciated that the computing device 1102 can include alternate and/or additional hardware, software, and/or firmware components beyond those described or depicted without departing from the scope of the invention. More particularly, it should be appreciated that software, firmware, and/or hardware components depicted as forming part of the computing device 1102 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) XXX. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being redefined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A sensor assembly associated with a vehicle, the sensor assembly comprising:

a base component;

a light detection and ranging (LiDAR) sensor mounted on a support platform disposed centrally on the base component;

a transparent cylinder disposed peripherally to the LiDAR sensor, wherein the transparent cylinder provides a field of view (FOV) for the LiDAR sensor and is rotatable independently of the base component;

a motor component disposed on the base component, adjacent to the support platform, wherein the motor component is coupled to the transparent cylinder through a gearset and configured to rotate the transparent cylinder; and a controller configured to:
  obtain sensor data from on-board vehicle sensors, wherein the sensor data further comprises vehicle velocity data, the vehicle velocity data indicating a velocity of the vehicle;
  determine a level of obscurement on the transparent cylinder based on the sensor data;
  determine that the level of obscurement exceeds a threshold level of obscurement;
  transmit an actuation signal to the motor component to cause a rotation of the transparent cylinder at a rotational speed, wherein the rotation of the transparent cylinder disperses obscurements on the transparent cylinder; and
  adjust the rotational speed based on the sensor data.

2. The sensor assembly of claim 1, wherein the base component comprises a first set of vent holes arranged concentrically around the support platform, and the transparent cylinder comprises a second set of vent holes disposed along a top portion of the transparent cylinder.

3. The sensor assembly of claim 2, further comprising:
  a circular cap disposed above the transparent cylinder, wherein the circular cap comprises a lip that overlaps the top portion of the transparent cylinder; and
  a fan blade attached to a rotatable portion of the support platform, wherein the motor component is configured to rotate the fan blade through the gearset.

4. The sensor assembly of claim 3, wherein the actuation signal to the motor component further causes a rotation of the fan blade at the rotational speed.

5. The sensor assembly of claim 4, wherein the rotation of the fan blade generates an airflow inside the sensor assembly through the first set of vent holes on the base component.

6. The sensor assembly of claim 5, wherein the airflow is generated using air from a passenger cabin of the vehicle or an air conditioning unit.

7. The sensor assembly of claim 5, wherein the airflow exits the sensor assembly through the second set of vent holes on the transparent cylinder.

8. The sensor assembly of claim 7, wherein the exiting airflow is redirected by the lip of the circular cap into one or more downward air streams, wherein the one or more downward air streams travel along an outer surface of the transparent cylinder and disperse the obscurements away from the transparent cylinder.

9. The sensor assembly of claim 1, wherein the rotational speed is determined based on surface tension of water, mass of a water droplet, radius of a water droplet, and radius of the transparent cylinder.

10. The sensor assembly of claim 1, wherein the obscurements on the transparent cylinder comprises one or more of water droplets, moisture, dusts, or debris.

11. The sensor assembly of claim 1, wherein the sensor data comprises at least one of moisture data or image data and the on-board sensors comprises at least one of a moisture sensor or a camera.

12. The sensor assembly of claim 11, wherein the controller determines the level of obscurement on the transparent cylinder based on the moisture data from the moisture sensor, wherein the moisture data indicates a level of moisture associated with the transparent cylinder.

13. The sensor assembly of claim 12, wherein the level of moisture is correlated with the level of obscurement.

14. The sensor assembly of claim 11, wherein the threshold level of obscurement is a predetermined level of moisture that impairs functions associated with the LiDAR through the FOV provided by the transparent cylinder.

15. The sensor assembly of claim 11, wherein the controller determines the level of obscurement on the transparent cylinder based on the image data from the camera, wherein the image data comprises one or more images captured by the camera through a second FOV provided by the transparent cylinder, wherein the one or more images indicates a number of obscurements on a portion of the transparent cylinder that provided the second FOV.

16. The sensor assembly of claim 15, wherein the controller determines that the level of obscurement exceeds the threshold level of obscurement by comparing the one or more images with a baseline image, wherein the baseline image is an image without obscurements.

17. The sensor assembly of claim 1, wherein the controller transmits a second actuation signal to the motor component to reduce the rotational speed when the velocity of the vehicle exceeds a threshold velocity.

18. A computer-implemented method of operating a sensor assembly associated with a vehicle, the method comprising:
  obtaining, by a controller of the sensor assembly, sensor data from on-board vehicle sensors;
  determining, by the controller of the sensor assembly, a level of obscurement on a transparent cylinder of the sensor assembly based on the sensor data, wherein the sensor data further comprises vehicle velocity data, the vehicle velocity data indicating a velocity of the vehicle;
  determining, by the controller of the sensor assembly, that the level of obscurement exceeds a threshold level of obscurement;
  transmitting, by the controller of the sensor assembly, an actuation signal to cause a rotation of the transparent cylinder at a rotational speed, wherein the rotation of the transparent cylinder disperses obscurements away from the transparent cylinder; and
  adjust the rotational speed based on the sensor data.

19. The computer-implemented-method of claim 18, wherein the actuation signal further causes a rotation of a fan blade associated with the sensor assembly that generates one or more downward air streams that travel along an outer surface of the transparent cylinder and disperse the obscurements away from the transparent cylinder.

20. A sensor assembly associated with a vehicle, the sensor assembly comprising:
  a base component;
  a light detection and ranging (LiDAR) sensor mounted on a support platform disposed centrally on the base component, wherein the base component comprises a first set of vent holes arranged around the support platform;

a transparent cylinder disposed peripherally to the LiDAR sensor, wherein the transparent cylinder provides a field of view (FOV) for the LiDAR sensor and is rotatable independently of the base component, wherein the transparent cylinder comprises a second set of vent holes disposed along a top portion;

a motor component disposed on the base component, adjacent to the support platform, wherein the motor component is coupled to the transparent cylinder through a gearset and configured to rotate the transparent cylinder; and a controller configured to:
  obtain sensor data from on-board vehicle sensors;
  determine a level of obscurement on the transparent cylinder based on the sensor data;
  determine that the level of obscurement exceeds a threshold level of obscurement; and
  transmit an actuation signal to the motor component to cause a rotation of the transparent cylinder at a rotational speed, wherein the rotation of the transparent cylinder disperses obscurements on the transparent cylinder.

* * * * *